(12) United States Patent
Kawabe et al.

(10) Patent No.: US 9,202,147 B2
(45) Date of Patent: Dec. 1, 2015

(54) IMAGE FORMING SYSTEM INCLUDING AN IMAGE READING UNIT IN A PAPER CONVEYING PATH DOWNSTREAM FROM AN IMAGE FORMING UNIT

(71) Applicant: KONICA MINOLTA, INC., Chiyoda-ku, Tokyo (JP)

(72) Inventors: Toru Kawabe, Hachioji (JP); Makoto Ikeda, Hachioji (JP); Mieko Ohkawa, Hino (JP); Daisuke Genda, Kawasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/286,732

(22) Filed: May 23, 2014

(65) Prior Publication Data

US 2014/0376013 A1    Dec. 25, 2014

(30) Foreign Application Priority Data

Jun. 19, 2013    (JP) .................................. 2013-128208

(51) Int. Cl.
*G06K 15/00*    (2006.01)
*G06K 15/02*    (2006.01)
*G06K 1/12*    (2006.01)
*G06K 15/12*    (2006.01)

(52) U.S. Cl.
CPC .............. *G06K 15/027* (2013.01); *G06K 1/121* (2013.01); *G06K 15/1223* (2013.01)

(58) Field of Classification Search
CPC . G06K 15/027; G06K 15/1223; G06K 1/121; G06F 17/5068; G06F 2217/12; H04N 1/40012; H04N 1/40093

USPC .................. 358/1.12, 518, 300, 1.14; 399/46; 347/9, 240, 251
See application file for complete search history.

(56) References Cited

U.S. PATENT DOCUMENTS

2012/0206756 A1* 8/2012 Nakashio ..................... 358/1.14

FOREIGN PATENT DOCUMENTS

JP    08328322 A    12/1996
JP    09068872 A    3/1997
(Continued)

OTHER PUBLICATIONS

Japanese Office Action (and English translation thereof) dated Jun. 9, 2015, issued in counterpart Japanese Application No. 2013-128208.

*Primary Examiner* — Martin Mushambo
(74) *Attorney, Agent, or Firm* — Holtz, Holtz, Goodman & Chick PC

(57) ABSTRACT

Disclosed is an image forming system, including: a conveying unit configured to convey recording paper; an image forming unit configured to print an image on the recording paper; an image reading unit configured to optically read the recording paper and to obtain a read image; and a correction control unit configured to control an execution of a test operation in which a test pattern including one or more thin lines are printed on the recording paper by the image forming unit and in which the test pattern is read by the image reading unit, to collect information indicting operation state of each unit in the execution of the test operation, to evaluate the thin lines in the read image obtained in the test operation in consideration of the collected information and to carry out a correction relating to printing of a specified thin line.

19 Claims, 21 Drawing Sheets

(56) References Cited

FOREIGN PATENT DOCUMENTS

| JP | 2008250046 A | 10/2008 |
| JP | 2009217086 A | 9/2009 |
| JP | 2010113070 A | 5/2010 |
| JP | 2012-170002 A | 9/2012 |

* cited by examiner

FIG.7

| AREA No | HORIZONTAL THIN LINE | | | | VERTICAL THIN LINE | | | |
|---|---|---|---|---|---|---|---|---|
| | C | M | Y | K | C | M | Y | K |
| 1 | | | | | | | | |
| 2 | | | | | | | | |
| 3 | | | | | | | | |
| ... | ... | ... | ... | ... | ... | ... | ... | ... |
| ... | ... | ... | ... | ... | ... | ... | ... | ... |
| N | | | | | | | | |

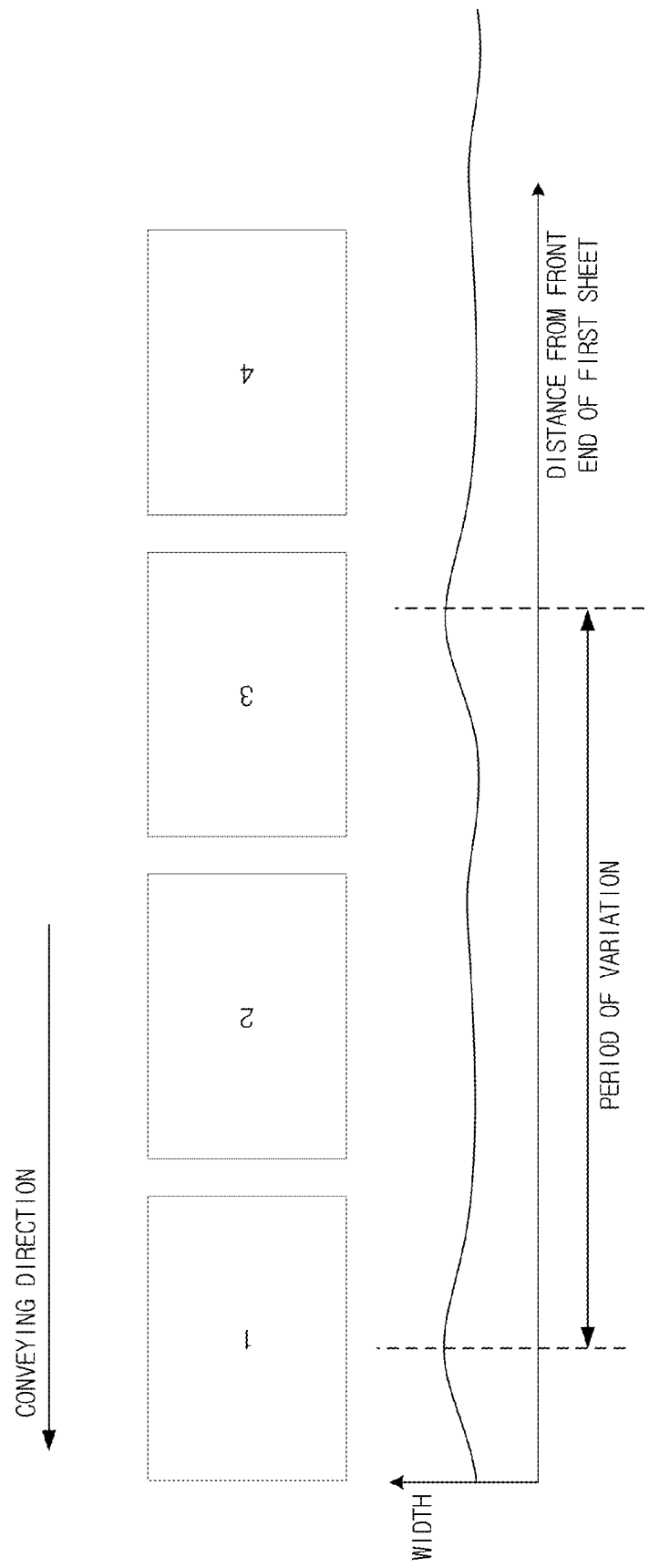

- 6 1 (THINNING STRENGTH: 100%)
- 6 2 (THINNING STRENGTH: 75%)
- 6 3 (THINNING STRENGTH: 50%)
- 6 4 (THINNING STRENGTH: 25%)
- 6 5 (THINNING STRENGTH: 0%)

FIG.18

|  | DATE AND TIME OF UPDATED REGISTRATION | THINNING CONDITION | WIDTH EVALUATION RESULT |
|---|---|---|---|
| POSITION CATEGORY 1 | | | |
| POSITION CATEGORY 2 | | | |
| POSITION CATEGORY 3 | | | |
| POSITION CATEGORY 4 | | | |
| POSITION CATEGORY 5 | | | |
| POSITION CATEGORY 6 | | | |
| POSITION CATEGORY 7 | | | |
| POSITION CATEGORY 8 | | | |
| POSITION CATEGORY 9 | | | |
| POSITION CATEGORY 10 | | | |

IMAGE FORMING SYSTEM INCLUDING AN IMAGE READING UNIT IN A PAPER CONVEYING PATH DOWNSTREAM FROM AN IMAGE FORMING UNIT

BACKGROUND OF THE INVENTION

1. Field of the Invention

The present invention relates to an image forming system for analyzing an image which is printed on recording paper, by optically reading the image, and for feeding back to the correction in the printing.

2. Description of Related Art

In a printing apparatus in which the accuracy of the printing is required, the image which is printed on the recording paper by the printing apparatus is optically read by a separate scanner and the read image is analyzed to correct the parameters used in the printing.

In Japanese Patent Application Publication No. 2012-170002, the technology in which an image is corrected so as to prevent a thin line from becoming thicker when an original is copied by a copy machine, is disclosed. In this technology, by reading a test chart in which thin lines are printed, with a scanner to analyze the test chart, the blurred edge which is caused when the original is read with the scanner, is detected. The correction parameter for thin lines, which is used when the image obtained by reading the original with the scanner is printed, is selected according to the degree of blurred edge.

In the method for correcting the parameter used in the printing by optically reading the image printed on the recording paper in the printing apparatus with a separate scanner and by analyzing the read image, it is difficult to analyze the read image in consideration of the detailed operation state of the printing apparatus in the printing of the image and the printing conditions. For example, it is difficult to output the information indicating the detailed operation state of the printing apparatus, such as the detailed contents of the image correction carried out in the printing apparatus, the information indicating the positional relation between the image printed on the recording paper and the photoconductor, and the like, from the printing apparatus to an external device. Even though the above information can be output, because of the large data size of the information, large tasks for inputting the information to the device for analyzing the image are required.

For example, the step for adding the detailed information in the printing of the image to the recording paper by using a barcode or the like is required. Alternatively, as shown in FIG. 21, the step for registering the detailed information relating to the operation state of each unit of the printing apparatus in the printing of the test pattern by using the printing apparatus and the printing conditions, in the database to transmit the detailed information to the analyzing device, is required. Further, there are limitations on the feedback of the analysis result to the printing apparatus.

In particular, in case that the width or the like of thin line is corrected, a high accurate correction cannot be carried out without considering the operation state of the apparatus in the printing of the test pattern and in the reading of the test pattern.

SUMMARY

To achieve at least one of the abovementioned objects, an image forming system reflecting one aspect of the present invention comprises:

a conveying unit configured to convey recording paper;

an image forming unit configured to print an image on the recording paper in a conveying path of the conveying unit;

an image reading unit configured to optically read the recording paper in the conveying path on a downstream side of the image forming unit and to obtain a read image; and a correction control unit configured to control an execution of a test operation in which a test pattern including one or more thin lines are printed on the recording paper by the image forming unit and in which the recording paper on which the test pattern is printed is read by the image reading unit, to collect information indicting operation state of each unit in the execution of the test operation, to evaluate the thin lines in the read image obtained in the test operation in consideration of the collected information and to carry out a correction relating to printing of a specified thin line.

Preferably, in the test pattern, the thin lines are arranged in portions of the recording paper, the correction control unit detects a width and a density of each thin line arranged in the portions in the read image, evaluates variation in the width and the density among the thin lines in the read image, and carries out the correction for suppressing the variation so as to cause the width and the density to be an intended width and an intended density.

Preferably, in the test pattern, the thin lines perpendicular to a conveying direction of the recording paper and the thin lines parallel to the conveying direction of the recording paper are arranged with each predetermined period in each of a plurality of small areas into which the recording paper is divided, and the correction control unit calculates a correction value for suppressing the variation, for each small area.

Preferably, in the test pattern, the thin lines are drawn in all colors used in the image forming unit, and the correction control unit calculates a correction value for suppressing the variation, for each color.

Preferably, each width of the thin lines constituting the test pattern corresponds to 1 to 5 pixels at a resolution of the image forming unit.

Preferably, the intended width and the intended density are calculated from an average of the variation.

Preferably, the intended width and the intended density are predetermined values.

Preferably, the correction control unit successively executes the test operation by using a plurality of sheets of the recording paper, detects a period of the variation in the width, which is caused in a conveying direction of the recording paper, from the read image obtained from the plurality of successive sheets of the recording paper, and changes a correction parameter for the width according to the detected period.

Preferably, a setting of an update period with which a correction parameter to be used in the correction is updated is received from a user, and the correction parameter is updated by executing the test operation with the update period.

Preferably, the test pattern includes a plurality of types of the thin lines which are obtained by correcting a width of a predetermined thin line in accordance with a plurality of candidates for a correction parameter, respectively, and the correction control unit compares each width of the thin lines in the read image obtained in the test operation, which are obtained by correcting the width of the predetermined thin line in accordance with the candidates for the correction parameter, with a reference width, and select the correction parameter among the candidates in accordance with a result of comparing each width with the reference width.

Preferably, the image forming system further comprises a correction parameter selecting unit configured to select a correction parameter for correcting a width of the specified thin line among a plurality of candidates for the correction parameter, wherein the test pattern includes a plurality of types of the thin lines which are obtained by correcting a width of a predetermined thin line in accordance with the plurality of candidates for the correction parameter, respectively, and the correction control unit compares each width of the thin lines in the read image obtained in the test operation, which are obtained by correcting the width of the predetermined thin line in accordance with the candidates for the correction parameter, with an intended width in case that each candidate for the correction parameter is used, and modifies each value of the candidates for the correction parameter in accordance with a result of comparing each width with the intended width.

Preferably, the correction control unit executes the test operation by using the test pattern including the thin line having a secondary color made by mixing a first color material and a second color material, the thin line having the first color obtained by using only the first color material and the thin line having the second color obtained by using only the second color material; and calculates a correction parameter for a width of the specified thin line having an optional secondary color made by mixing an optional amount of the first color material and an optional amount of the second color material in accordance with a width of the thin line having the secondary color, a width of the thin line having the first color and a width of the thin line having the second color in the read image obtained in the test operation to carry out the correction relating to the printing of the specified thin line having the optional secondary color.

Preferably, increase in the width of the thin line having the secondary color, which occurs due to a misregistration which is caused when the first color material and the second color material are overlapped, is subtracted from the width of the thin line having the secondary color in the read image obtained in the test operation.

Preferably, the image forming unit forms the image by scanning the image with a plurality of laser beams in parallel, and the correction control unit evaluates each thin line in the read image obtained in the test operation, by specifying a laser beam used for forming the image on each pixel, and carries out the correction relating to the printing of the specified thin line according to the laser beam used for the printing of the specified thin line.

Preferably, the specified thin line is drawn by using one laser beam or by combining a plurality of laser beams.

Preferably, the image forming unit has a one-side printing mode for printing the image on only one side of the recording paper, and a two-side printing mode for printing the images on both a front side of the recording paper and a rear side of the recording paper, and the correction control unit evaluates each thin line for a case in which the test operation is executed in the one-side printing mode, a case in which the test operation is executed for the front side in the two-side printing mode and a case in which the test operation is executed for the rear side in the two-side printing mode, respectively, and carries out the correction relating to the printing of the specified thin line according to a case in which the specified thin line is printed in the one-side printing mode, a case in which the specified thin line is printed on the front side in the two-side printing mode or a case in which the specified thin line is printed on the rear side in the two-side printing mode.

Preferably, the correction control unit recognizes a pixel position of a light receiving element in the image reading unit, which reads each thin line in the test pattern, from the collected information, and detects variation in a state of a width of the thin line, by comparing data obtained by reading the thin line with the light receiving element having the same pixel position.

Preferably, the correction control unit recognizes a phase difference between the thin line in the test pattern and a light receiving element in the image reading unit, which reads the thin line, from the collected information, and detects variation in a state of a width of the thin line, by comparing data obtained in case that the phase difference is within a acceptable range.

Preferably, the image forming system further comprises a direction changing unit configured to change a conveying direction of the recording paper or a direction of the recording paper between the image forming unit and the image reading unit so as to direct a straight line printed by the image forming unit in a direction which is not the conveying direction of the recording paper to a direction perpendicular to a reading direction in which the image is read by the image reading unit line by line.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 7 is a view showing an example of the thinning condition table which is prepared in the first example;

FIG. 8 is a view showing a situation in which the period of the variation in the line width, which is caused in the conveying direction of the recording paper, is detected by executing the test operation successively for a plurality of sheets of recording paper;

FIG. 18 is a view showing an example of the registered contents of the database in the sixth example;

DETAILED DESCRIPTION OF PREFERRED EMBODIMENT

Hereinafter, a preferred embodiment of the present invention will be explained with reference to the accompanying drawings.

Figure 1:
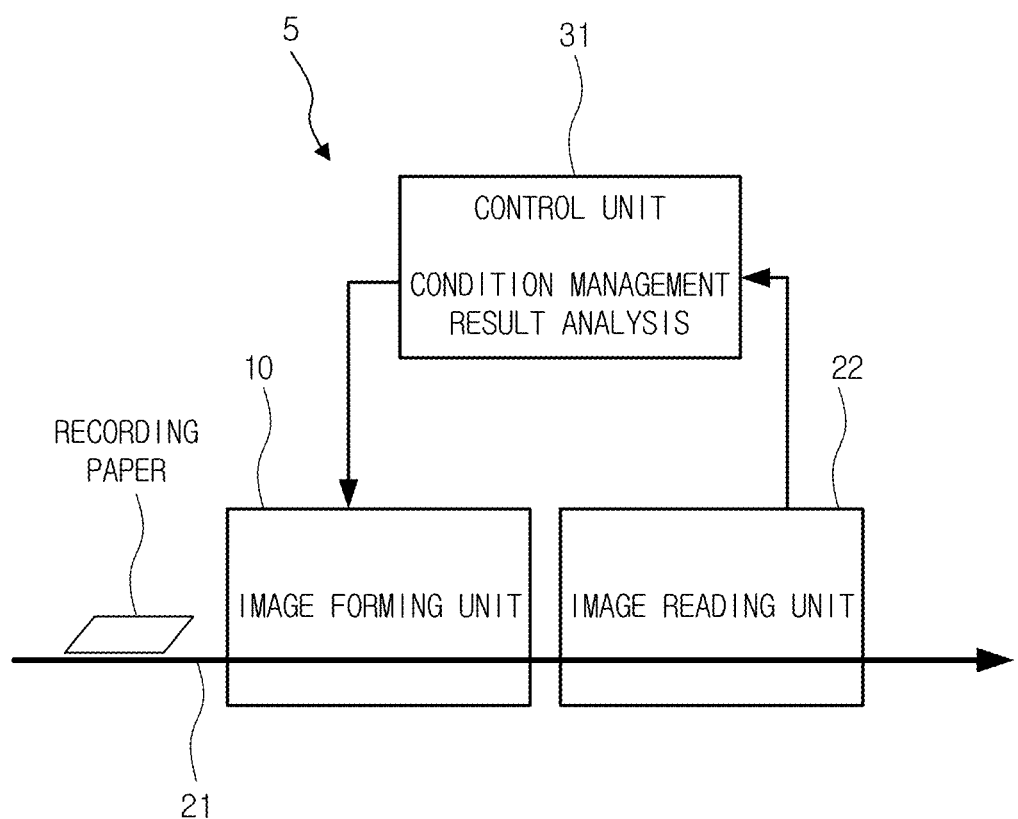
FIG. 1 is a view showing the basic configuration of the image forming system according to the embodiment.

FIG. 1 shows the basic configuration of the image forming system 5 according to the embodiment. The image forming system 5 comprises a conveying unit 21 for conveying the recording paper, an image forming unit 10 for printing an image on the recording paper in the conveying path, an image reading unit 22 for optically reading the recording paper in the conveying path on the downstream side of the image forming unit 10 to obtain the read image, and a control unit (also referred to as "CPU") 31 for controlling the entire operation of the image forming system 5. As the correction control unit, the control unit 31 controls the execution of the test operation in which the test pattern including thin lines is printed on the recording paper by the image forming unit 10 and in which the recording paper is read by the image reading unit 22, and collects the information indicating the operation state of each unit (the image forming unit 10 and the image reading unit 22) in the execution of the test operation (hereinafter, referred to as "detailed operation information"). Further, the control unit 31 evaluates the thin lines in the read image obtained in the test operation in consideration of the detailed operation information, and carries out the correction relating to the subsequent printing of the thin lines.

Figure 2:
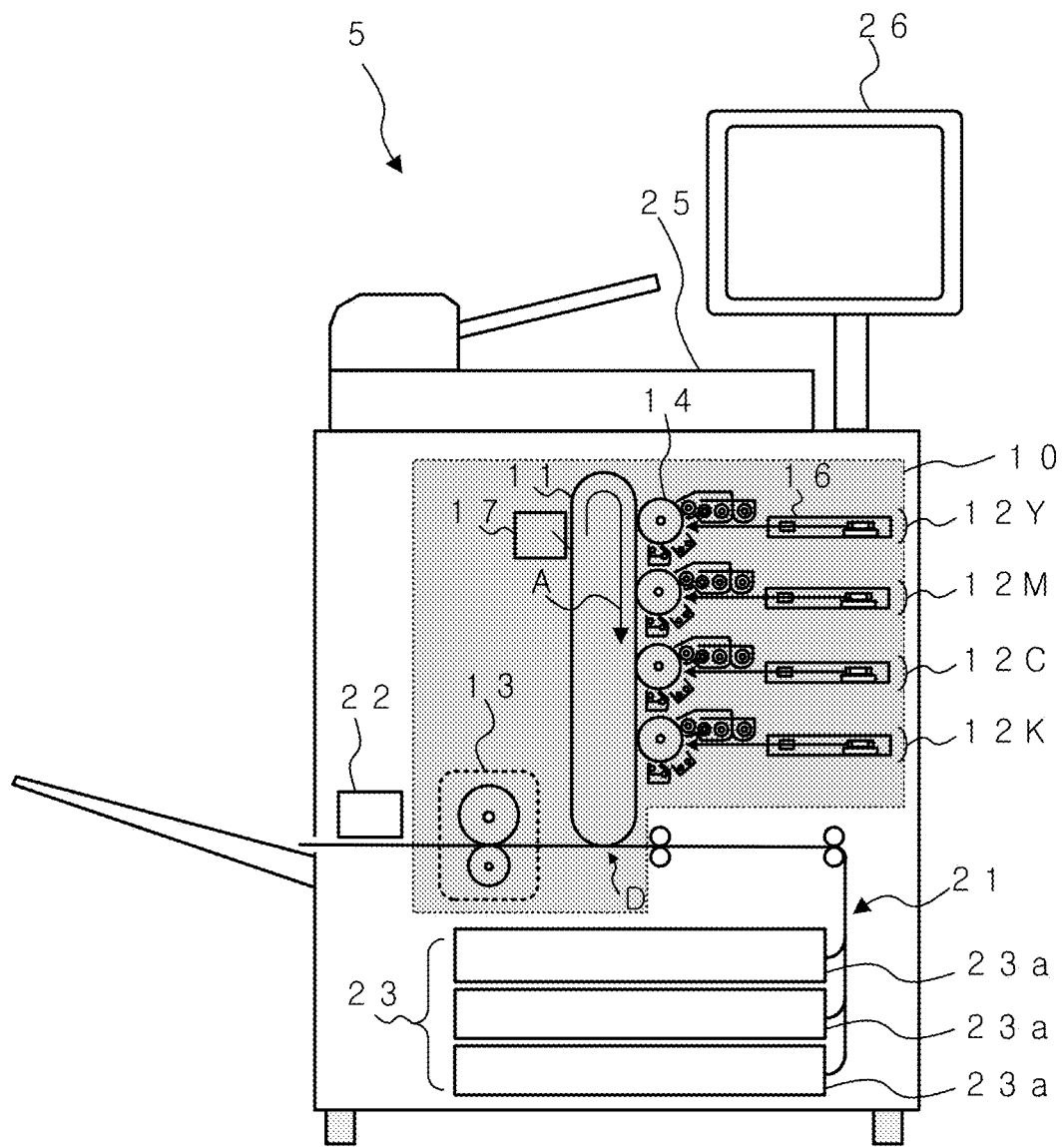
FIG. 2 is a view showing the mechanical schematic configuration of the image forming system.

FIG. 2 shows an example of the specific configuration of the image forming system 5. The image forming system 5 is configured as a so-called multi-function peripheral having the printing function for printing out a color image on the recording paper in accordance with the image data input via a network or the like, the copy function for printing an image on the recording paper in accordance with the image data obtained by optically reading an original, and the like.

The image forming unit 10 of the image forming system 5 comprises an endless intermediate transfer belt 11 which is bridged annularly and which has a predetermined width, four toner image forming units 12Y, 12M, 12C and 12K which form single color toner images having the colors of yellow (Y), magenta (M), cyan (C) and black (K), respectively on the intermediate transfer belt 11, and a fixing device 13 for fixing the toner image formed on the recording paper by heating and pressing the toner image on the recording paper.

The toner image forming units 12Y, 12M, 12C and 12K use the toners having different colors from each other, and have the same structure. Each of the toner image forming units 12Y, 12M, 12C and 12K comprises a cylindrical photoconductive drum 14 as an electrostatic latent image carrier on which the electrostatic latent image is formed. In each toner image forming unit 12Y, 12M, 12C and 12K, a charging device, a developing device, a transfer device, a cleaning device and the like, are provided around the photoconductive drum 14. Further, each toner image forming unit 12Y, 12M, 12C and 12K comprises a laser unit 16 having laser diodes, a polygon mirror, various types of lenses and mirrors, and the like.

In each toner image forming unit 12Y, 12M, 12C and 12K, the photoconductive drum 14 is rotated in a specified direction by actuating an actuating unit which is not shown in the drawings, and the charging device uniformly charges the photoconductive drum 14. The laser unit 16 emits the laser beam by being switched on/off in accordance with the image data having the corresponding color and scans the photoconductive drum 14 by using the emitted laser beam to form the electrostatic latent image on the surface of the photoconductive drum 14. In this embodiment, each laser unit 16 scans the photoconductive drum 14 by using a plurality of laser beams in parallel, and forms the electrostatic latent image for a plurality of adjacent lines, simultaneously.

The developing device visualizes the electrostatic latent image formed on the photoconductive drum 14 by using the toner. The toner image formed on the photoconductive drum 14 is transferred to the intermediate transfer belt 11 at the position on which the photoconductive drum 14 contacts with the intermediate transfer belt 11. The cleaning device removes and collects the toner remaining on the photoconductive drum 14 after the transfer, by rubbing the photoconductive drum 14 with a blade or the like.

The intermediate transfer belt 11 is wound so as to be bridged by a plurality of rollers, and is rotated in the direction of the arrow A in the drawing. In the process of the rotation of the intermediate transfer belt 11, the images (toner images) of the respective colors are overlapped on the intermediate transfer belt 11 in the order of the color Y, the color M, the color C and the color K by the toner image forming units 12Y, 12M, 12C and 12K. Thereby, the full color image is composed. This color image is transferred from the intermediate transfer belt 11 to the recording paper at the second transferring position D. Further, the toner remaining on the intermediate transfer belt 11 is removed by the cleaning device 17 provided on the downstream side of the second transferring position D. The fixing device 13 is provided at the downstream position of the second transferring position D on the conveying path of the conveying unit 21.

The image forming unit 10 comprises a paper feeding unit 23 for feeding the recording paper to be conveyed by the conveying unit 21. The paper feeding unit 23 comprises a plurality of paper feeding trays 23a for containing a large number of sheets of recording paper to be used for the printing (image forming), and feeds the recording paper from the selected paper feeding tray to the conveying unit 21 sheet by sheet.

The conveying unit 21 conveys the recording paper fed from the paper feeding tray 23 through the second transferring position D and the fixing device 13. Further, the conveying unit 21 conveys the recording paper through the reading position of the image reading unit 22 and discharges the recording paper to the paper discharging tray. The conveying unit 21 comprises conveying rollers and a guide unit which forms the conveying path, motors for driving the conveying rollers, and the like.

The image forming unit 10 has the two-side printing function for printing images on both sides of the recording paper. The two-side printing function is not shown in FIG. 2. Specifically, the conveying unit 21 comprises the reversing path which diverges from the normal conveying path on the downstream side of the fixing device 13 and which converges with the conveying path on the upstream side of the second transferring position D after the recording paper is reversed. In case that the two-side printing is carried out, the image forming system 5 forms and fixes the image on the front side of the recording paper, and reverses the recording paper through the reversing path. Then, the image forming system 5 forms and fixes the image on the rear side of the recording paper and discharges the recording paper to the paper discharging tray.

Further, the image forming system 5 comprises a scanner unit 25 for reading the original set to the original tray by a user, an operation panel unit 26 for receiving the operation from a user and displaying various types of windows, and the like.

Figure 3:
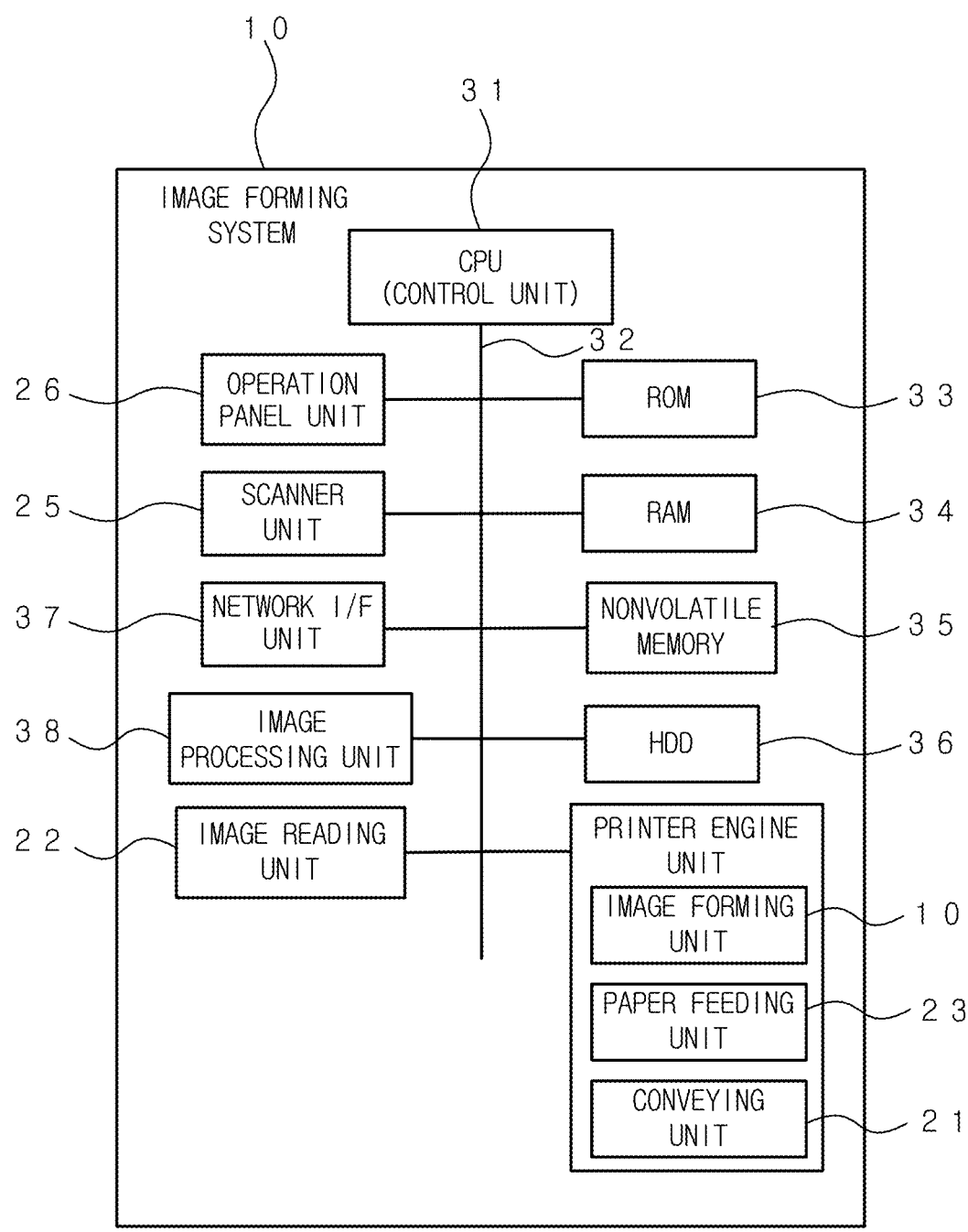
FIG. 3 is a block diagram showing the electric schematic configuration of the image forming system.

FIG. 3 is a block diagram showing the electric schematic configuration of the image forming system 5. The image forming system 5 comprises the CPU (Central Processing Unit) 31 as the control unit for controlling the entire operation of the image forming system 5. The CPU 31 is connected with a ROM (Read Only Memory) 33, a RAM (Random Access Memory) 34, a nonvolatile memory 35, an HDD (Hard Disk Drive) 36, the scanner unit 25, the operation panel unit 26, a network I/F unit 37, an image processing unit 38, the image reading unit 22, a printer engine unit, and the like via a bus 32.

By the CPU 31, a middleware, application programs and the like are executed on an OS (Operating System) program as a base. In the ROM 33, various types of programs are stored. By executing the processes by the CPU 31 in accordance with these programs, the functions of the printing system 10 are realized in addition to the test operation, the operation relating to the correction for the printing of the thin lines.

The RAM 34 is used as a work memory for temporarily storing various types of data when the CPU 31 executes the programs, an image memory for storing image data, and the like.

The nonvolatile memory 35 is a rewritable memory (flash memory) in which the stored contents are held even if the image forming system 5 is turned off. In the nonvolatile memory 35, the unique information of the image forming system 5, various types of setting information, and the like, are stored.

The HDD 36 is a large-capacity nonvolatile storing device. In the HDD 36, print data, image data, the detailed operation information which is described above, various types of correction parameters which are used when the thin lines are printed, and the like, are stored.

The printer engine unit comprises the image forming unit 10, the paper feeding unit 23 and the conveying unit 21 which are described above, and the like. The printer engine unit is operated in accordance with the control from the CPU 31.

The image reading unit 22 comprises a light source for irradiating the recording paper passing through the reading position with light, a line image sensor for reading the recording paper line by line in the width direction of the recording paper by receiving the reflected light from the recording paper, and the like. The image reading unit 22 repeats the reading operation for reading the image by one line in the width direction (direction perpendicular to the conveying direction) of the recording paper conveyed by the conveying unit 21. Thereby, the reading unit 22 reads the whole surface of the conveyed recording paper as a two-dimensional image.

In this embodiment, the image reading unit 22 has the function of reading the both sides of the recording paper, simultaneously. The image reading unit 22 may have the configuration in which only one side of the recording paper is read at a time, and may reverse the recording paper by using the reversing path of the conveying unit 21 to read both sides of the recording paper. In this case, the reversing path diverges from the conveying path on the downstream side of the image reading unit 22.

The operation panel unit 26 comprises a liquid crystal display, a touch panel which is provided on a screen of the liquid crystal display and which detects the coordinate position on which the liquid crystal display is pressed by a pen, a finger or the like, operation switches, such as a numerical keypad and a start key, and the like. The operation panel unit 26 displays various types of operation windows, setting windows and system state windows, and receives various types of operations, such as job input and setting, from a user.

The scanner unit 25 has a function of optically reading the original to obtain image data. For example, the scanner unit 25 comprises a light source for irradiating the original with the light, a line image sensor for reading the original line by line in the width direction of the original by receiving the reflected light, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like. The scanner unit 25 comprises an auto document feeder for feeding the original sheet by sheet from a stack of the original set to the original tray to convey the original via the reading position to a paper discharge position.

The network I/F unit 37 communicates with an external device connected via a network such as a LAN (Local Area Network). For example, the network I/F unit 37 receives print data from the external device.

The image processing unit 38 performs the rasterization processing for converting print data into image data, the compression/decompression processing of image data, the image processing for correcting the width of the thin line, and the like, in addition to the processings, such as the enlargement/reduction and the rotation of the image. The image processing unit 38 has the function for carrying out various types of correction for the image data to be printed, which is output to the printer engine unit.

Figure 4:
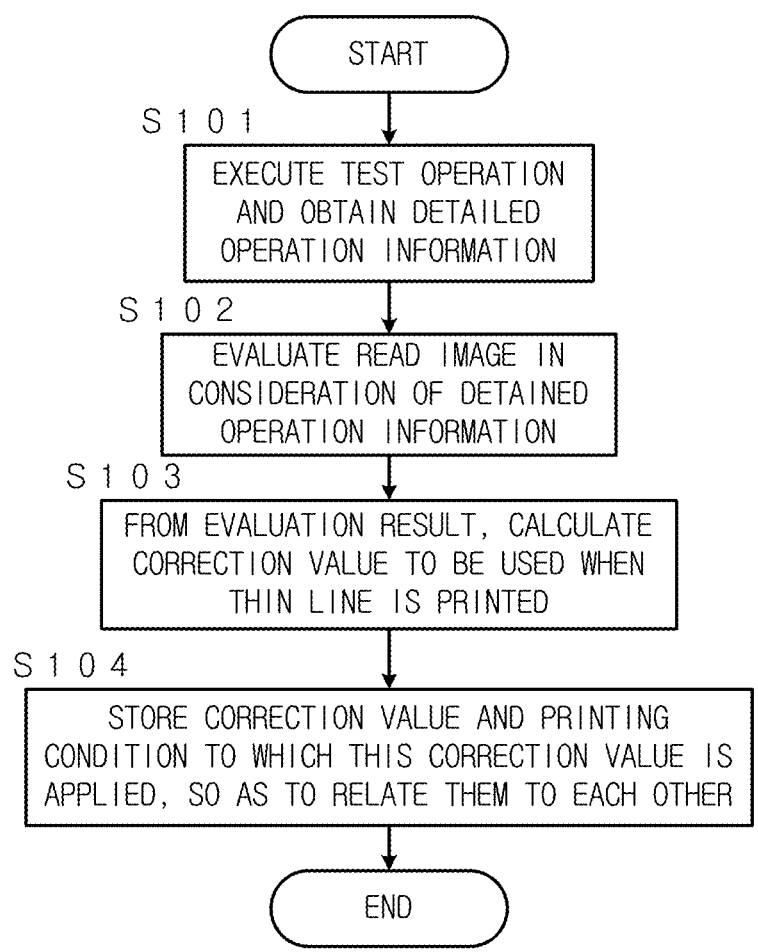
FIG. 4 is a flowchart showing the summary of the process relating to the test operation of the image forming system.

FIG. 4 shows the summary of the process relating to the test operation of the image forming system 5. Firstly, the test operation in which the test pattern is printed by the image forming unit 10 and in which the printed image is immediately read by the image reading unit 22 provided on the downstream side of the image forming unit 10, is executed (Step S101). At this time, the detailed operation information, such as the operation state, the operation condition of the test operation, and the like, is obtained and stored.

The detailed operation information includes the operation state and the printing condition of the image forming unit 10, the operation state and the reading condition of the image reading unit 22, and the like. For example, the detailed operation information includes the contents of the image processing which is carried out by the image forming unit 10, the detailed information of the test pattern, such as the position, the width, the density and the color of each thin line to be printed, the position information of the photoconductive drum 14 and the intermediate transfer belt 11, which relates to the image forming on each pixel in the recording paper, the number assigned to the laser beam used for the image forming on each pixel (the forming of the electrostatic latent image), the state of the developing device, the information relating to the two-side printing and the one-side printing, the information relating to the type of the used recording paper, the position and phase information of the light receiving element which reads each pixel of the test pattern printed on the recording paper, and the like. Further, the detailed operation information may include optional information relating to the correction which is carried out when the thin lines are printed.

Next, each thin line in the image read by the image reading unit 22 is evaluated in consideration of the above detailed operation information (Step S102). For example, from the relationship between the width of each thin line in the read image and the position of the photoconductive drum 14 in the printing of the thin line, the width of each thin line is evaluated in consideration of the variation in the width of the thin line, which is caused by the difference in the position of the photoconductive drum 14.

Next, from the above evaluation result, the correction value to be used when the thin line is printed is calculated (Step S103). Then, the calculated correction value and the printing condition to which the calculated correction value is applied are stored so as to relate them (Step S104). For example, the position information of the photoconductive drum 14, to which each correction value is applied, is stored as the printing condition to which the correction value is applied, so as to relate the position information to the correction value.

Next, the operation for printing an image by using the correction value obtained in the test operation, will be explained.

Figure 5:
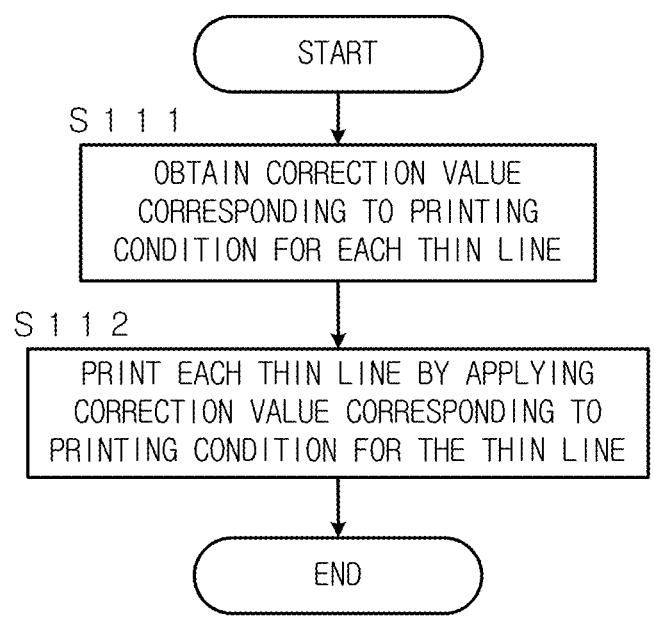
FIG. 5 is a flowchart showing the operation for printing an image by referring the correction value.

FIG. 5 shows the flowchart of the operation for printing an image by using the correction value obtained in the test operation. Firstly, the CPU 31 of the image forming system 5 analyzes the print data to be used for the printing, extracts the thin lines in the image to be printed, and obtains the information, such as the color and the width of each line and the position of each line in the recording paper. Further, before the printing is started, the CPU 31 recognizes the detailed operation of the image forming unit 10 in the printing of the image in accordance with the print data. For example, the CPU 31 detects the position of the photoconductive drum 14 and recognizes the portion of the photoconductive drum 14, which is used to print each line on the recording paper next.

Based on the above information, the CPU 31 specifies each printing condition for each thin line and each edge portion in the image to be printed next (the width and the color of the line, the position of the thin line in the recording paper, the position of the photoconductive drum 14 to be used, the number assigned to the laser beam to be used, and the like) (Step S111). When each line is printed, the CPU 31 corrects the image data by applying the correction value which is stored so as to relate the correction value to the specified printing condition for the thin line, and executes the printing (Step S112).

As described above, the test pattern is printed by the image forming unit 10 and the detailed operation information is obtained in real time when the printed test pattern is read by the image reading unit 22. Further, each thin line in the read image obtained by the image reading unit 22 is evaluated in consideration of the detailed operation information and the correction for the subsequent printing of the thin line is carried out in accordance with the above evaluation result. Therefore, it is possible to carry out the correction in consideration of the detailed operation state of each unit. As a result, it is possible to carry out the correction for the width of the thin line and the like with high accuracy.

Hereinafter, the specific examples of the correction based on the test operation, will be explained.

First Example

Figure 6:
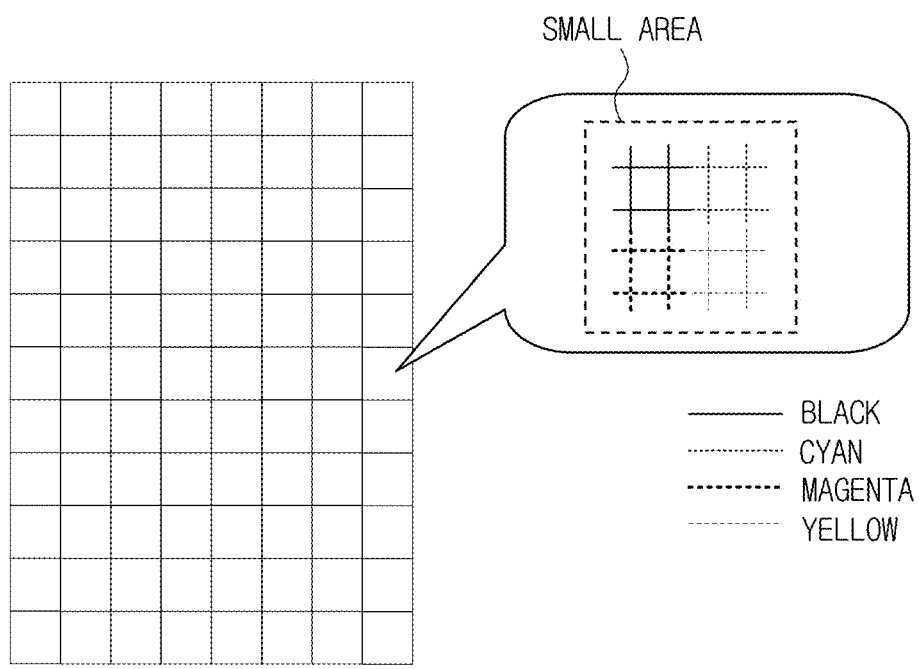
FIG. 6 is a view showing the test pattern according to the first example.

In the first example, as shown in FIG. 6, the thin lines are printed so as to disperse the thin lines into each portion of the recording paper. Specifically, the recording paper is divided into a large number of small rectangular areas which are arranged in a matrix. The test pattern in which in each small area, horizontal lines perpendicular to the conveying direction of the recording paper and vertical lines parallel to the conveying direction of the recording paper are arranged with the predetermined period, is used. In this case, the test pattern in which in each small area, the thin lines drawn in the all colors which are used in the image forming unit 10, that is, C, M, Y and K, respectively, are arranged in a lattice form, is used. The area number for specifying the position of each small area is assigned to each small area.

Further, each width of the thin lines constituting the test pattern is set to the width corresponding to 1 to 5 pixels at the resolution of the image forming unit 10. The set width of thin line can be changed.

The test operation using the test pattern is executed and the read image is analyzed. Then, the information relating to the width and the density of the thin line for each small area, for each color, for the horizontal direction and for the vertical direction, is obtained.

The CPU 31 of the image forming system 5 calculates the correction value for correcting the width and the density of the thin line in the printing, for each small area, for each color, for the horizontal direction and for the vertical direction in accordance with the above information. Then, the CPU 31 prepares the thinning condition table 50 having the format shown in FIG. 7, and stores the correction values.

Subsequently, in case that the thin lines are printed, the CPU 31 corrects the width and the density of each line by referring the thinning condition table 50. Specifically, the correction value is obtained from the thinning condition table 50 according to the small area including the thin line to be printed, the color of the thin line, the direction of the line, and corrects the image data of the thin line by using the obtained correction value to print the thin line.

In this example, the correction for suppressing the variation in the width and the density of the thin line is carried out so as to cause the width and the density of the thin line to be the intended width and the intended density. For example, it is judged whether the variation in the width and the density is not less than the predetermined threshold. In case that the variation is not less than the threshold, the correction is carried out so as to cause the width and the density to be the intended width and the intended density. The intended width and the intended density are calculated from the average of the variation obtained in the test operation, or the predetermined values are used as the intended width and the intended density.

As shown in FIG. 8, in case that the periodicity in the convey direction of the recording paper (vertical direction) exists in the variation in the width of the thin line, the test operation is successively executed by using a plurality of sheets of recording paper. From the read images which are printed on a plurality of successive sheets of recording paper, the period of the variation in the width of the thin line, which is caused in the conveying direction of the recording paper, is detected. The correction value for the width of the thin line is changed according to the detected period. In case that the variation having the long period which straddles a plurality of sheets of recording paper is detected, the test pattern to be used is set to the test pattern which is suitable for the detection of the above variation.

Second Example

As the test pattern, the pattern including a plurality of types of thin lines which are obtained by correcting the width of the predetermined thin line in accordance with a plurality of types of candidates for the correction parameter, respectively, is used. The evaluation result of the test operation is fed back in order to modify the value of each candidate for the correction parameter.

Figure 9A:
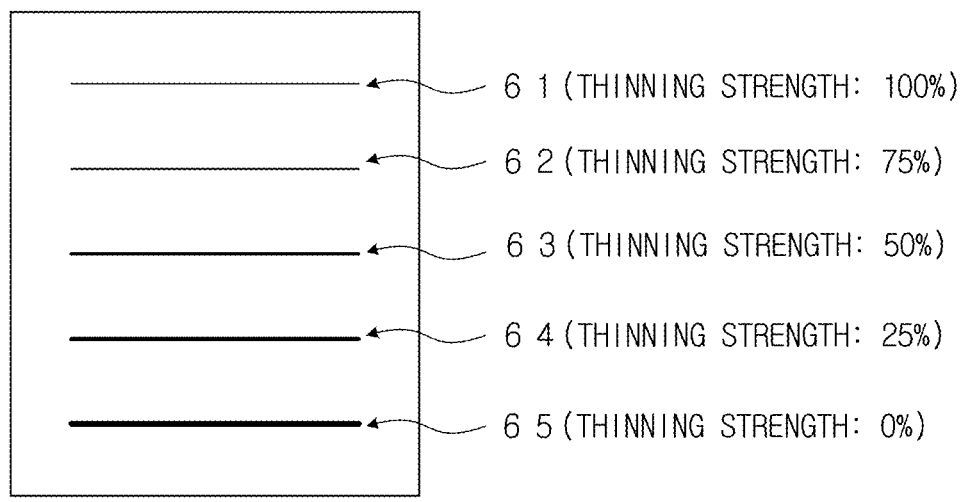
FIG. 9A is a view showing the test pattern according to the second example.

FIG. 9A shows the test pattern including a plurality of types of lines which are obtained by applying the different correction conditions (thinning conditions) to the reference line having the same width (for example, 8 pixels). In FIG. 9A, the first line 61 is a line obtained by applying the correction condition having the thinning strength of 100%. The second line 62 is a line obtained by applying the correction condition having the thinning strength of 75%. The third line 63 is a line obtained by applying the correction condition having the thinning strength of 50%. The fourth line 64 is a line obtained by applying the correction condition having the thinning strength of 25%. The fifth line 65 is a line obtained by applying the correction condition having the thinning strength of 0% (without the correction). As the thinning strength is close to 100%, the width of the thin line is corrected thinly.

The CPU 31 of the image forming system 5 compares the width of each thin line in the read image which is obtained in the test operation using the above test pattern, with the intended width in case that each thinning strength is applied. Based on the above comparison result, the value of the correction parameter which is related to each thinning strength is modified. The detailed operation information collected in the test operation includes the position of each line in the recording paper, the thinning strength which is applied to each thin line, and the like. By referring the detailed operation information, the CPU 31 of the image forming system 5 recognizes the thinning strength which is applied to each thin line in the read image.

Figure 9B:
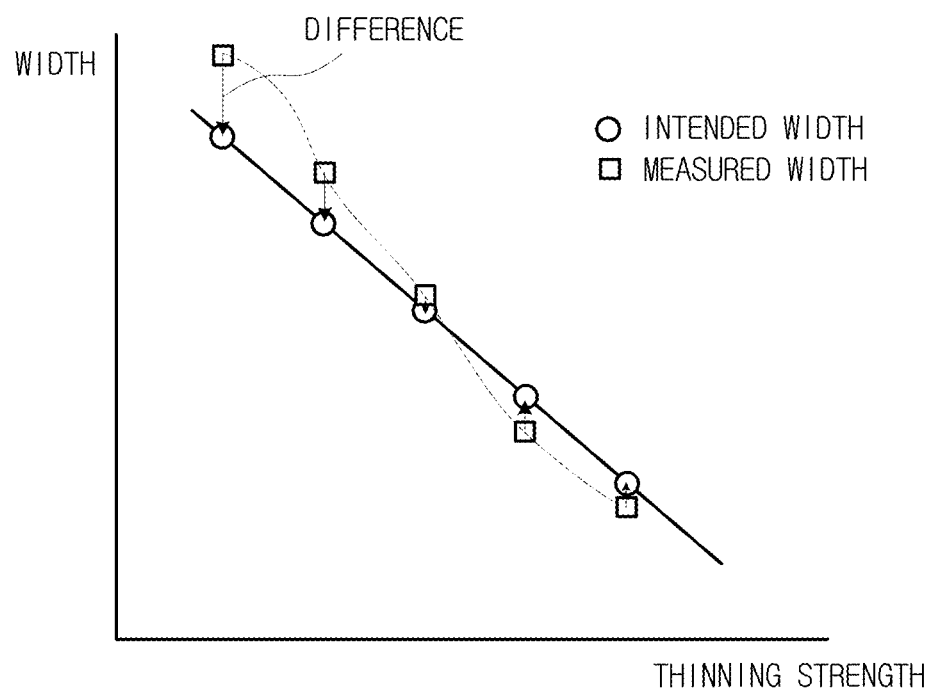
FIG. 9B is a graph showing the relation between the thinning strength and the line width.

FIG. 9B shows the graph of the relation between the intended width in each thinning strength and the width of the thin line in each thinning strength, which is obtained from the read image by printing the test pattern (referred to as "measured width"). The value of the correction parameter which is related to each thinning strength is modified so as to eliminate the difference between the measured width and the intended width in each thinning strength. For example, the value of the correction parameter for obtaining the intended width is estimated from the measured widths corresponding to a plurality of candidates for the correction parameter, and the value of the correction parameter is modified to the estimated value.

In order to adjust the value of the correction parameter in detail, a large number of thin lines obtained by using a large number of correction parameters having the values which are different little by little, are printed as the test pattern, and the graph showing the relation between the value of the correction parameter and the measured width is prepared. Then, the value of the correction parameter corresponding to the width plotted on the graph, which is coincident with the intended width, is calculated for each thinning strength. The value of the correction parameter in each thinning strength is modified to the calculated value of the correction parameter.

Modified Second Example

As the test pattern, the pattern including a plurality of types of thin lines which are obtained by correcting the width of the predetermined thin line in accordance with a plurality of types of candidates for the correction parameter, respectively, is used. The candidate for the correction parameter to be used in the printing is selected in accordance with the evaluation result of the test operation.

The CPU 31 of the image forming system 5 compares the width of each thin line in the read image which is obtained in the test operation using the test pattern which is the same as that of FIG. 9A (measured width), with the reference width which is previously determined. Based on the above comparison result, the correction parameter to be used in the printing, that is, the thinning strength is selected. For example, the thinning strength in which the measured width is the closest to the reference width is selected.

Third Example

The width of the thin line having the secondary color made by mixing two color materials (for example, C and M) is corrected.

The test pattern includes the thin line having the secondary color made by mixing the first color material and the second color material (for example, C and M), the thin line having the first color obtained by using only the first color material and the thin line having the second color obtained by using only the second color material. It is preferable that the data relating to these lines is obtained in one test operation by using one test pattern including these lines. However, these lines may be divided into the respective test patterns and the respective test operations may be separately executed.

The CPU 31 of the image forming system 5 executes the test operation by using the above test pattern, and obtains the width of the thin line having the secondary color, the width of the thin line having the first color and the width of the thin line having the second color in the read image obtained in the test operation. Then, based on the three widths thereof, the correction parameter for the width of the thin line having an optional secondary color made by mixing an optional amount of the first color material and an optional amount of the second color material is calculated and the correction for the printing of the thin line having the above optional secondary color is carried out.

For example, the case in which the thin line having the first color is a thin line drawn by using C color toner having the toner amount of 100%, the thin line having the second color is a thin line drawn by using M color toner having the toner amount of 100%, and the thin line having the secondary color is a thin line drawn by using the toner obtained by mixing C color toner having the toner amount of 100% and M color toner having the toner amount of 100%, is assumed.

By executing the test operation using the test pattern including the above thin lines, the CPU 31 of the image forming system 5 calculates the correction amount for the width of the thin line having the first color (thinning strength H1 for causing the width to be the intended width), which is used when the thin line having the first color (using C color toner having the toner amount of 100%) is printed, the correction amount for the width of the thin line having the second color (thinning strength H2 for causing the width to be the intended width), which is used when the thin line having the second color (using M color toner having the toner amount of 100%) is printed, and the correction amount for the width of the thin line having the secondary color (thinning strength H3 for causing the width to be the intended width), which is used when the thin line having the secondary color (using C color toner having the toner amount of 100% and M color toner having the toner amount of 100%) is printed. The detailed operation information collected in the test operation includes the information indicating the position of each printed thin line of the first color, the second color and the secondary color, the information indicating the toner amount of each color toner which is used for each line, and the like.

Figure 10:
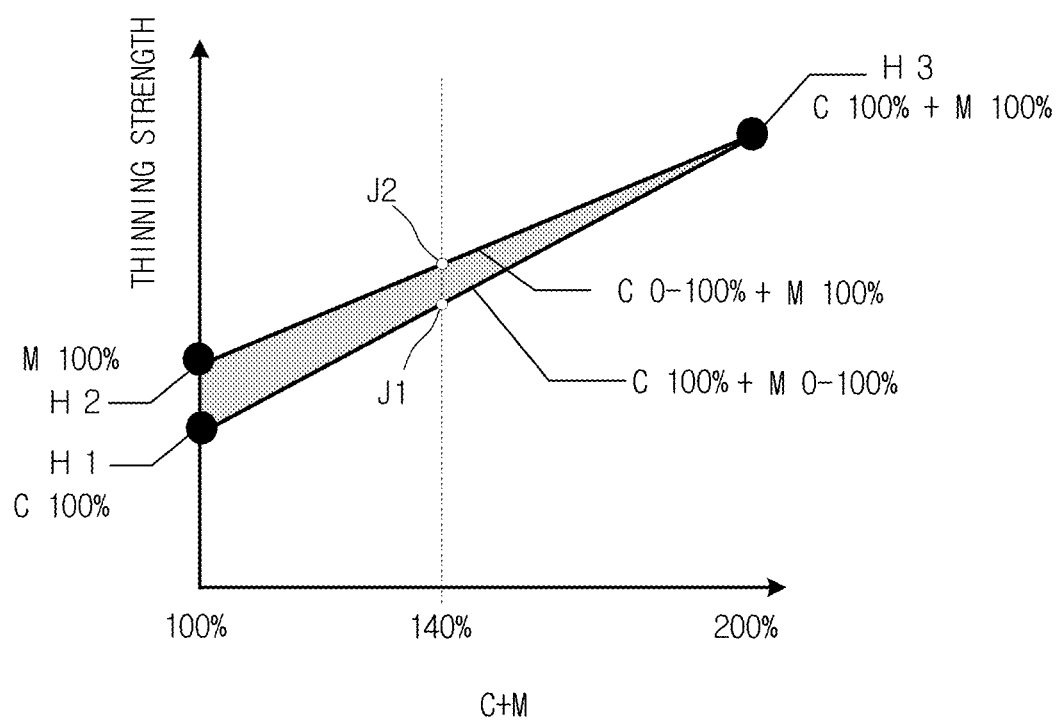
FIG. 10 is a view showing the relation between the toner amount of secondary color and the thing strength in the third example.

FIG. 10 is a graph showing the thinning strength which is calculated from the above three thinning strengths H1, H2 and H3 and which is applied to the secondary color made by mixing the C color toner and the M color toner. In FIG. 10, the total toner amount of the secondary color exceeds 100%. The line connecting H1 and H3 shows the thinning strength for the secondary color made by mixing C color toner having the toner amount of 100% and M color toner having the toner amount of 0 to 100%. The line connecting H2 and H3 shows the thinning strength for the secondary color made by mixing C color toner having the toner amount of 0 to 100% and M color toner having the toner amount of 100%. The gray area enclosed by these lines indicates the area including the thinning strength which is available in case that the total toner amount of the combination of C color and M color is from 100% to 200% and the component ratio of the toners is optional.

By referring the graph shown in FIG. 10, when the total toner amount of the combination of C color and M color and the component ratio of the toners are grasped, the thinning strength which is suitable for the secondary color can be calculated. For example, in case that the total toner amount is 140% and the component ratio between C color and M color is 4:6, the thinning strength for the secondary color is calculated by using the following formula: (thinning strength J1 in case that the C color toner having the toner amount of 100% and the M color toner having the toner amount of 40% are used)×0.6+(thinning strength J2 in case that the M color toner having the toner amount of 100% and the C color toner having the toner amount of 40% are used)×0.4.

The above graph is prepared by correcting the width of the thin line having the secondary color in the read image obtained in the test operation so as to subtract the increase in the width, which occurs by the misregistration (registration displacement) caused when two coloring materials are overlapped on the intermediate transfer belt 11. Therefore, it is possible to eliminate the increase in the width due to the registration displacement. As a result, the correction for only the line thickened by scattering the toners when the toners are overlapped can be carried out. The registration displacement is corrected by a separate method.

Fourth Example

The width of each line is corrected according to each laser beam for forming the pixels of the edge portion of the thin line in the image (forming an electrostatic latent image).

As described above, the laser unit 16 for each color of the image forming unit 10 scans the photoconductive drum 14 by using a plurality of laser beams, simultaneously, and forms the electrostatic latent image for a plurality of lines, simultaneously. Because the width of each line depends on the individual difference among the laser beams, the laser beam for forming the electrostatic latent image on the pixels of the edge portion in each thin line is specified, and the width of each line in the read image obtained in the test operation is evaluated. Further, in the subsequent printing, the laser beam used for the image forming on the pixels of the edge portion in each thin line is specified. Then, the correction parameter for the width of the thin line, which corresponds to the specified laser beam is used.

Figure 11:
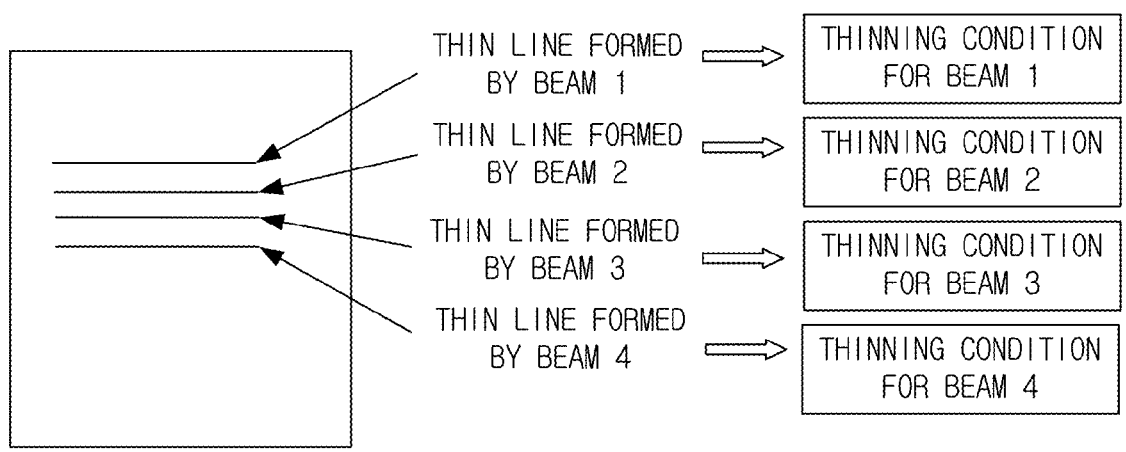
FIG. 11 is a view showing the correspondence relation between the test pattern according to the fourth example and the laser beam.

For example, as shown in FIG. 11, in the test operation, the horizontal thin lines (straight lines extending in the scanning direction of the laser beam) each of which has the width of 1 pixel are printed by using all of the laser beams to evaluate the width of each thin line. Then, the thinning condition obtained by evaluating the thin line formed by using the laser beam 1 is registered as the thinning condition for the laser beam 1. The thinning condition obtained by evaluating the thin line formed by using the laser beam 2 is registered as the thinning condition for the laser beam 2. With respect to the thinning condition for each of the laser beams 3 and 4, the thinning condition is obtained by the method which is the same as the above method.

Then, in the printing of the thin line or the edge portion, the laser beam used for the image forming on the pixels in the thin line or the edge portion is specified, and the thinning condition corresponding to the specified laser beam is applied.

The control unit 31 of the image forming system 5 manages and controls the laser beam to be assigned to the image data of each line. Therefore, the control unit 31 of the image forming system 5 recognizes the laser beam used for the image forming on each pixel. That is, as the detailed operation information in the test operation, the information indicating the laser beam used for the image forming on each pixel is collected and the thin line is evaluated by using the collected information.

Figure 12:
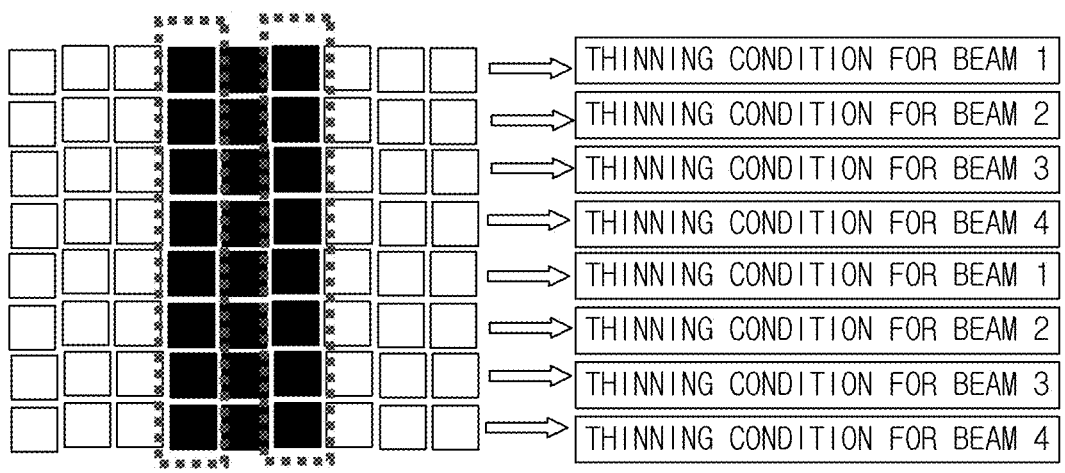
FIG. 12 is a view showing the thinning conditions for the respective laser beams, which are applied to each edge pixel in case that the vertical thin line having the width of 3 pixels is printed.

FIG. 12 shows an example of the case in which the vertical thin line (perpendicular to the scanning direction of the laser beam) having the width of 3 pixels is printed. In this case, because the laser beam to be used for the image forming is different according to the pixel position in the vertical direction, the thinning condition to be applied to the pixels of the edge portion in the thin line is changed according to each pixel position in the vertical direction.

Figure 13:
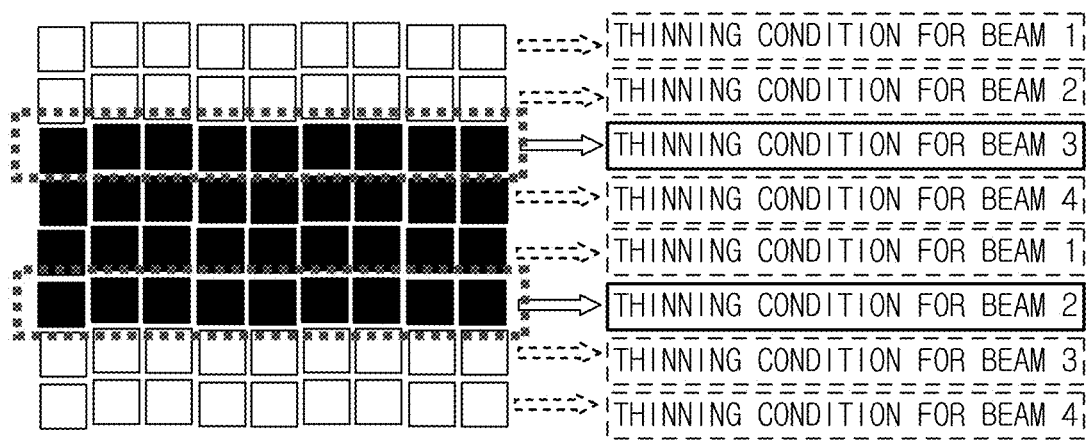
FIG. 13 is a view showing the thinning conditions for the respective laser beams, which are applied to each edge pixel in case that the horizontal thin line having the width of 4 pixels is printed.

FIG. 13 shows an example of the case in which the horizontal thin line (thin line in the scanning direction of the laser beam) having the width of 4 pixels is printed. Because each pixel of the line forming the upper edge portion of the thin line is formed by using the laser beam 3, the image data of the above line is corrected by applying the thinning condition for the laser beam 3 to the above line, and the above line is printed. Further, because each pixel of the line forming the lower edge portion of the thin line is formed by using the laser beam 2, the image data of the above line is corrected by applying the thinning condition for the laser beam 2 to the above line, and the above line is printed.

Fifth Example

The correction parameter is changed according to the one-side printing, the front side in the two-side printing and the rear side in the two-side printing.

The test operation is executed both in the one-side printing mode and the two-side printing mode. The read image obtained in each test operation is evaluated for the one-side printing, the front side in the two-side printing and the rear side in the two-side printing, respectively. Then, the thinning condition for the one-side printing, the thinning condition for the front side in the two-side printing and the thinning condition for the rear side in the two-side printing are obtained and registered. In this case, it is recognized whether the side read by the image reading unit 22 in the test operation is the side on which the image is formed in the one-side printing, the front side in the two-side printing or the rear side in the two-side printing, from the detailed operation information in the execution of the test operation.

Figure 14:
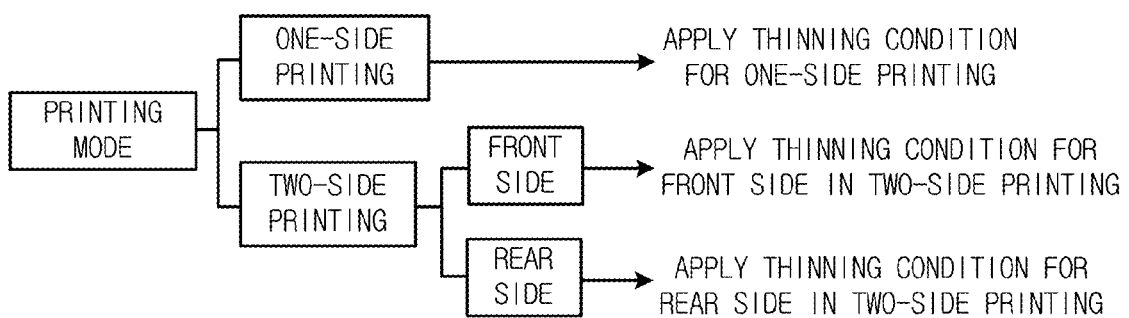
FIG. 14 is a view showing an example in which the thinning conditions are applied to the one-side printing, the front side in the two-side printing and the rear side in the two-side printing, respectively in the fifth example.

As shown in FIG. 14, in case that the one-side printing is carried out, the thinning condition for the one-side printing is applied. In case that an image is formed on the front side in the two-side printing, the thinning condition for the front side in the two-side printing is applied. In case that an image is formed on the rear side in the two-side printing, the thinning condition for the rear side in the two-side printing is applied. Then, the image correction is carried out.

Sixth Example

By specifying the light receiving element of the image reading unit 22, which is used for the reading of the thin line, the thin line in the read image is evaluated in consideration of the variation in the reading of the thin line.

Figure 15:
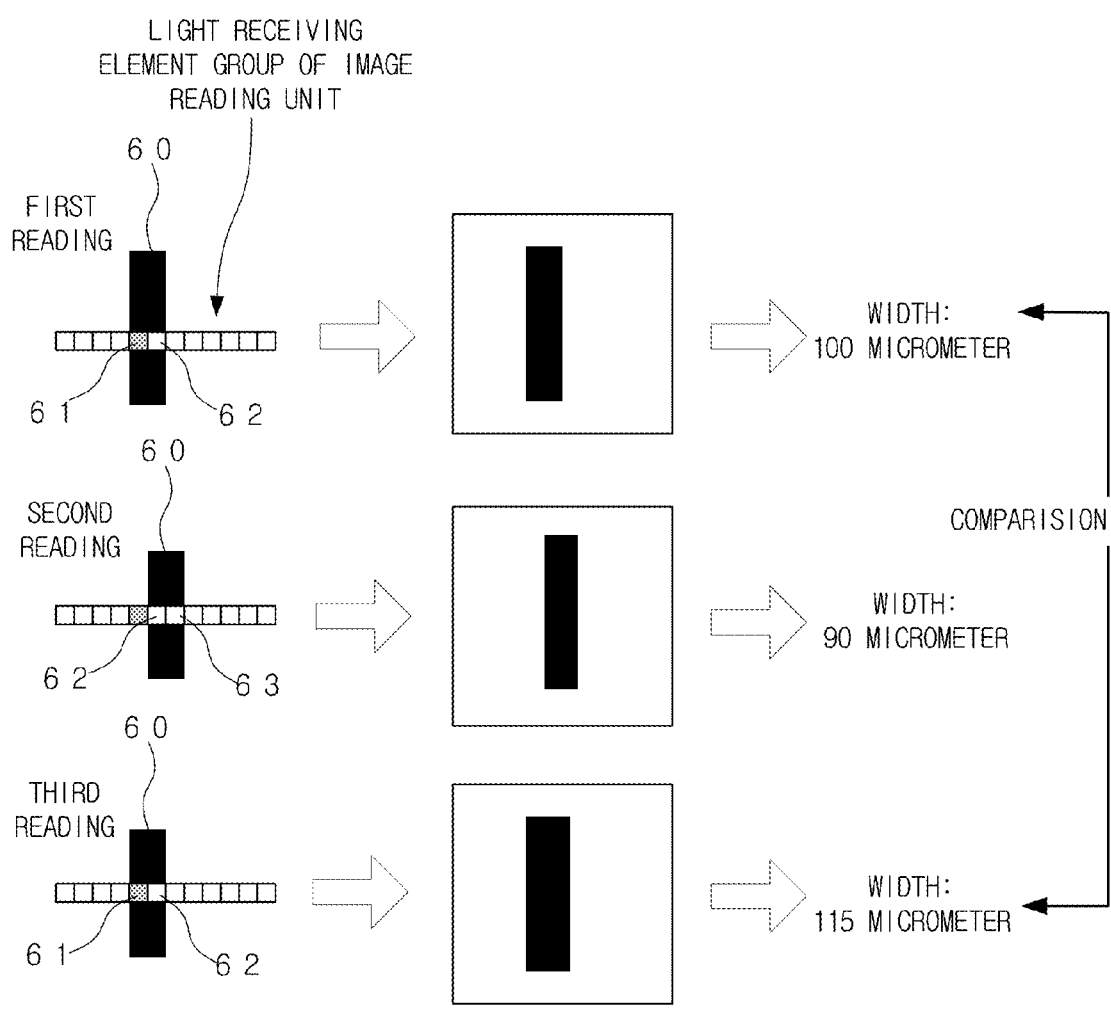
FIG. 15 is a view showing the situation in which the data obtained by reading the thin line with the light receiving elements of the image forming unit, which are arranged in the same positions, are compared with each other in the sixth example.

For example, the same test pattern is printed periodically (for example, every when images are printed on 100 sheets of recording paper), and it is monitored whether the width of the thin line is varied or not. In case that the width is varied, the correction is carried out. At this time, as shown in FIG. 15, the data obtained by reading the thin line with the light receiving elements of the image reading unit 22, which are arranged in the same positions, are compared with each other. The data obtained by reading the same thin line with different light receiving elements are excluded from the data to be compared.

In the example of FIG. 15, the thin line 60 is read by using the light receiving element 61 and the light receiving element 62 in the first test operation. The thin line 60 is read by using the light receiving element 62 and the light receiving element 63 in the second test operation. The thin line 60 is read by using the light receiving element 61 and the light receiving element 62 in the third test operation. Therefore, by comparing the result of the measurement of the width of the thin line 60, which is obtained in the first test operation with the result of the measurement of the width of the thin line 60, which is obtained in the third test operation, the variation in the width of the thin line is detected. The result of the measurement of the width of the thin line 60, which is obtained in the second test operation, is not used.

Figure 16:
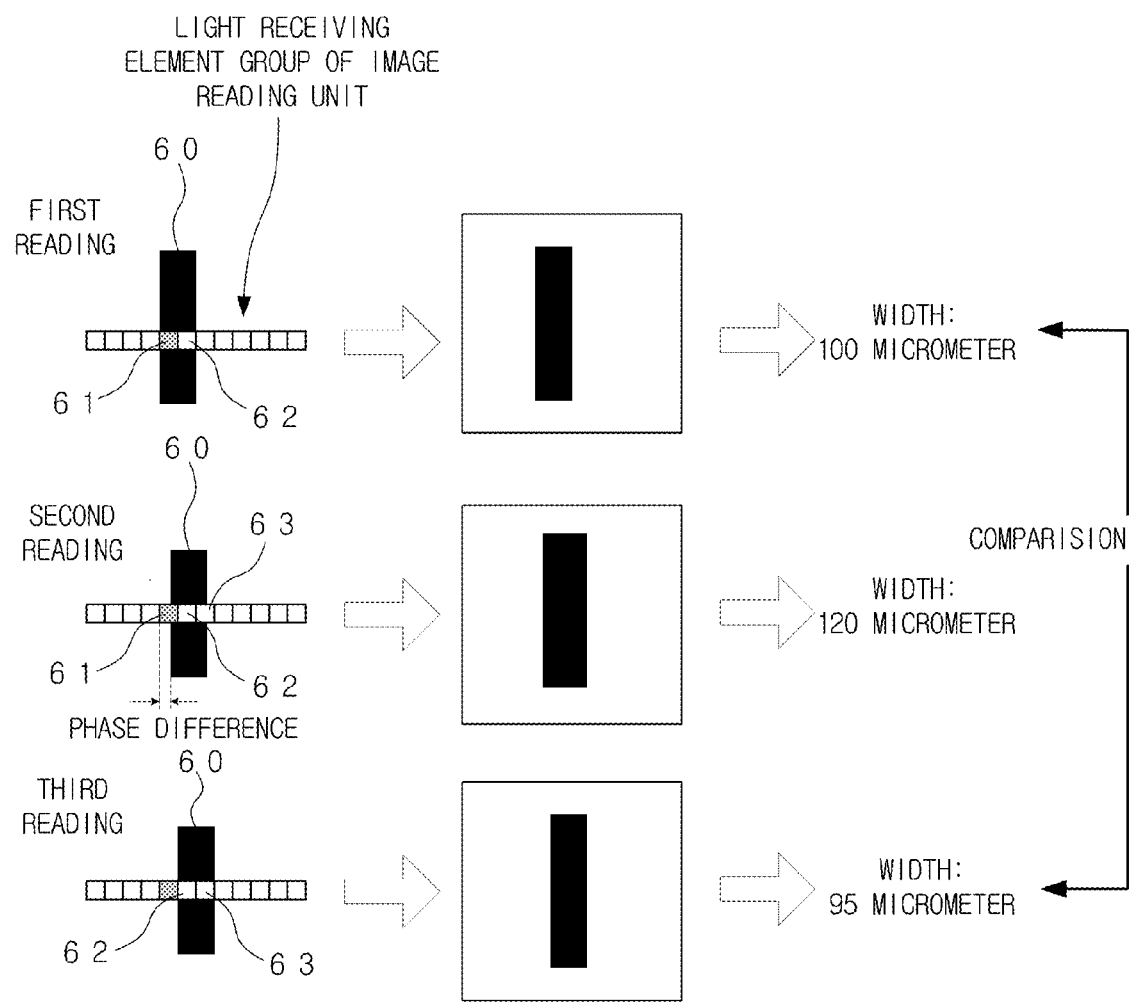
FIG. 16 is a view showing the situation in which the data obtained in case that the phase difference (position shift amount) between the light receiving element and the thin line is within the predetermined acceptable range, are compared with each other in the sixth example.

As shown in FIG. 16, the data obtained in case that the phase difference (position shift amount) between the light receiving element and the thin line is within the predetermined acceptable range, are compared with each other. Even though the same thin line is measured, the data in which the position shift amount exceeds the predetermined acceptable range are excluded from the data to be compared. For example, the predetermined acceptable range is set to about ¼ pixel to ⅙ pixel. The predetermined acceptable range can be optionally changed.

In the example of FIG. 16, the thin line 60 is read by using the light receiving element 61 and the light receiving element 62 in the first test operation (the phase difference is not caused). The thin line is read by using the light receiving elements 61, 62 and 63 in the second test operation (the phase difference of ½ pixel is caused). The thin line 60 is read by using the light receiving element 62 and the light receiving element 63 in the third test operation (the phase difference is not caused). Even though the light receiving elements used for reading the thin line are different between the first test operation and the third test operation, the phase is the same in the above two test operations. Therefore, by comparing the result of the measurement of the width of the thin line 60, which is obtained in the first test operation with the result of the measurement of the width of the thin line 60, which is obtained in the third test operation, the variation in the width of the thin line is detected. The result of the measurement of the width of the thin line 60, which is obtained in the second test operation is not used because the phase of each light receiving element is shifted by ½ pixel as compared with the other results.

Figure 17:
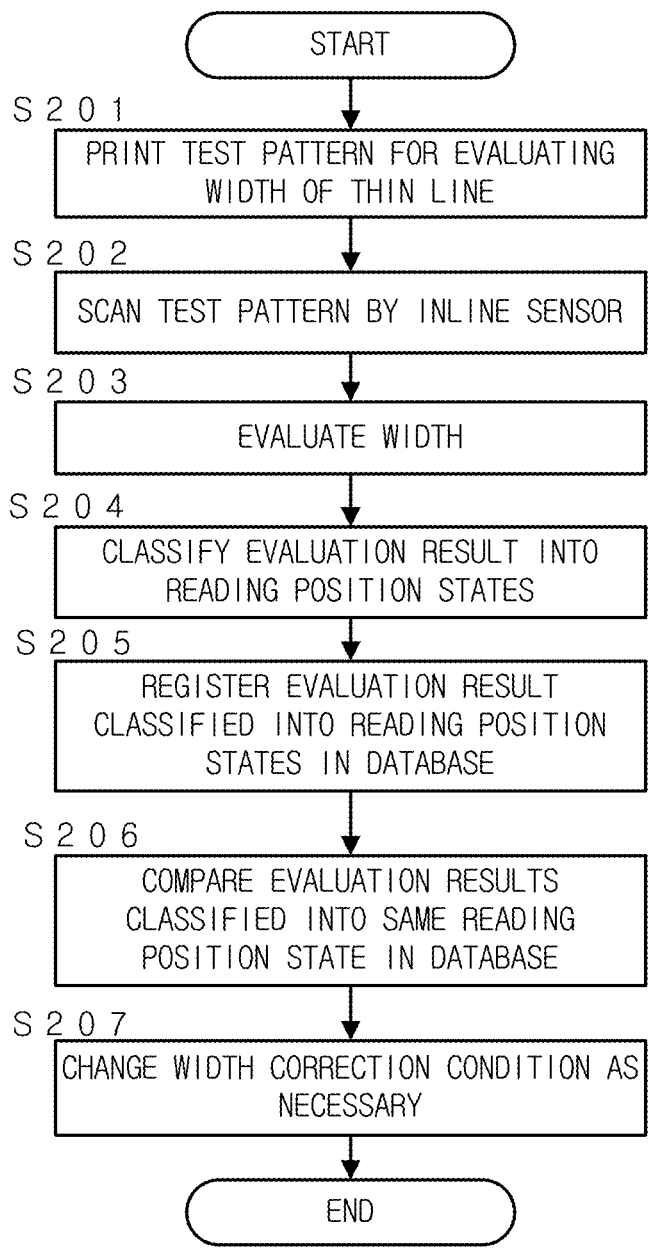
FIG. 17 is a flowchart showing the process relating to the test operation in the sixth example.

FIG. 17 shows the flowchart of the process for evaluating the thin line in the read image in consideration of the variation in the reading position during the reading of the image. Firstly, the test pattern including the thin lines is printed by the image forming unit 10 (Step S201). The printed test pattern is read immediately by the image reading unit 22 which is provided on the downstream side of the image forming unit 10 (Step S202).

Next, the width of each thin line in the read image is evaluated (Step S203), and the evaluation result for each thin line is classified into the reading position states (absolute position or phase of the light receiving element) from the information indicating the pixel position of each light receiving element in the image reading unit 22 used for the reading of each line. For example, in case that the evaluation result is classified based on the phase, the phase difference of 1 pixel is considered as 360 degrees. Then, the evaluation result is classified into the position category 1 in which the phase difference is not less than 0 degree and less than 45 degrees, the position category 2 in which the phase difference is not less than 45 degrees and less than 90 degrees, the position category 3 in which the phase difference is not less than 90 degrees and less than 135 degrees, . . . , or the like (Step S204).

Next, the evaluation result for each thin line is registered in a database so as to classify the result into the reading position states (Step S205). FIG. 18 shows an example of the registered contents of the database. In the database, the updated width evaluation results which are classified into the same position category and the thinning conditions are registered with the date and time of the registration.

By returning to FIG. 17, the explanation is continued. Next, the CPU 31 of the image forming system 5 compares the previous evaluation result with the current evaluation result by referring the above database (Step S206). At this time, the evaluation results which are classified into the same category of the reading position state are compared with each other. The evaluation results which are classified into the different categories, respectively, are not compared with each other. After the evaluation results are compared, in case that the variation in the width is caused above a certain level, the width correction condition is changed (Step S207). Then, the process is ended.

The process shown in FIG. 17 may be carried out in each printing by printing the test pattern out of the effective area of the recording paper, which is available by a user, and the evaluation result for the thin line may be fed back.

Next, the mechanical configuration which is added in order to improve the accuracy of the test operation, will be explained.

The mechanism for changing the direction of the recording paper on which an image is printed by the image forming unit 10 or the conveying direction of the recording paper, is provided. Therefore, in addition to the thin lines drawn along the conveying direction in the printing, the other lines can be read by a specific light receiving element of the image reading unit 22.

Figure 19:
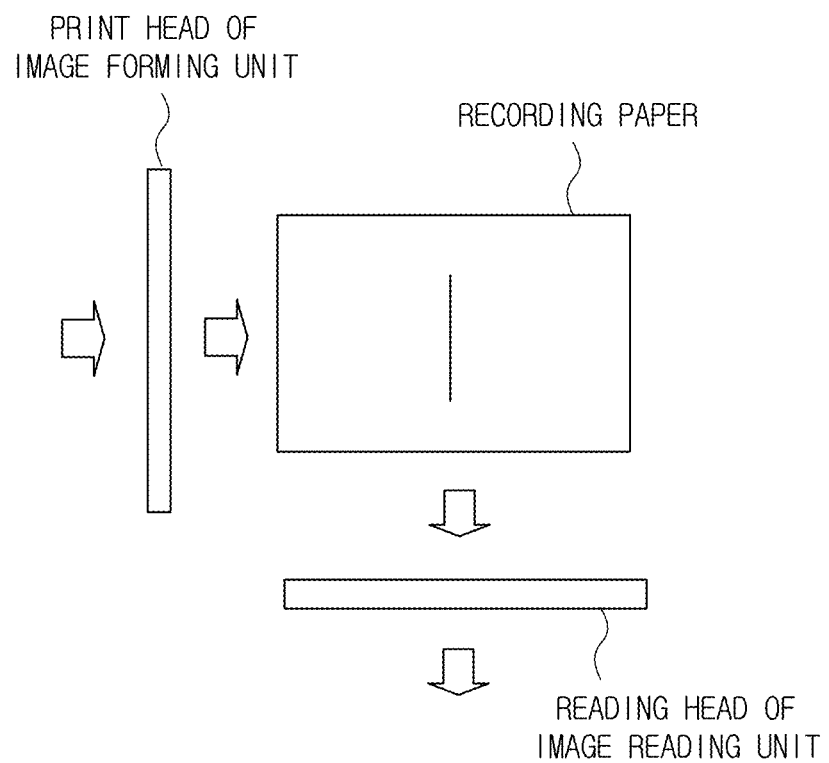
FIG. 19 is a view showing an example in which the conveying direction of the recording paper is changed in the conveying path.

FIG. 19 shows an example in which the conveying direction of the recording paper is changed in the conveying path.

In the image forming unit 10, the recording paper is conveyed in the direction perpendicular to the direction of the print head (scanning direction of the laser beam). Then, the conveying direction of the recording paper is changed by 90 degrees by using a changing unit between the image forming unit 10 and the image reading unit 22. Therefore, it is possible to read the whole of one line printed by the image forming unit 10 in the direction perpendicular to the conveying direction, by using the same light receiving element in the reading head of the image reading unit 22.

Figure 20:
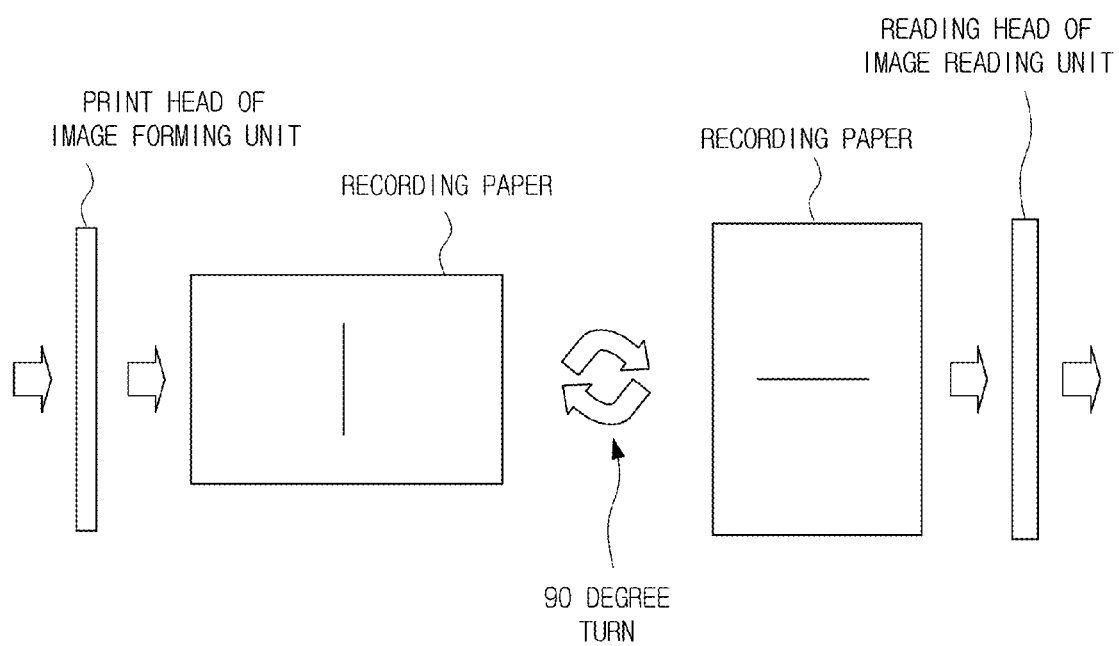
FIG. 20 is a view showing an example in which the direction of the recording paper is changed in the conveying path.
Figure 21:
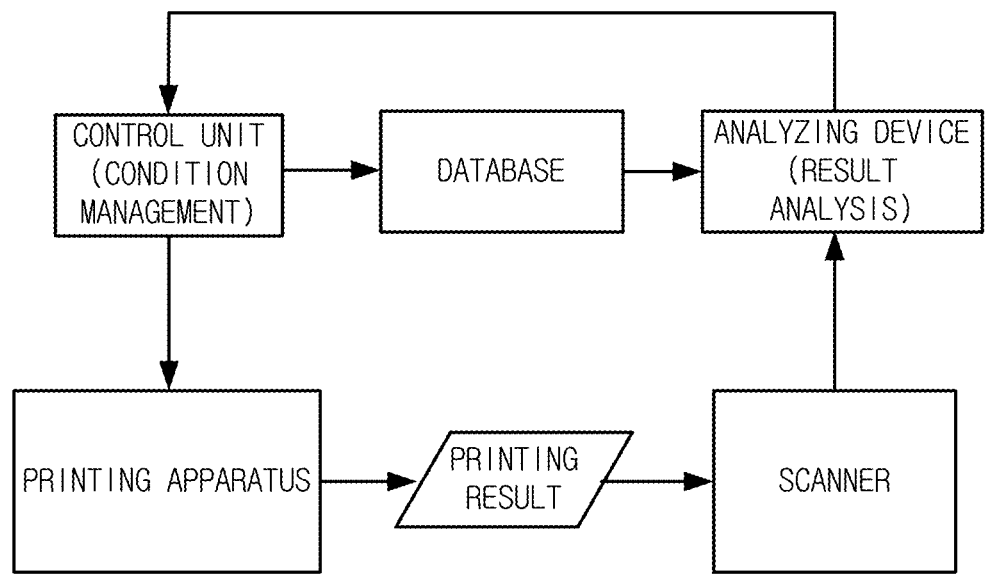
FIG. 21 is a view showing the system configuration and the transmission of the data relating to the correction in case that the printing apparatus and the scanner are separated from each other.

FIG. 20 shows the case in which the direction of the recording paper is changed in the conveying path. In the image forming unit 10, the recording paper is conveyed in the direction perpendicular to the direction of the print head. Then, the recording paper is turned 90 degrees to change the direction of the recording paper by 90 degrees by using a changing unit between the image forming unit 10 and the image reading unit 22. Therefore, it is possible to read the whole of one line printed by the image forming unit 10 in the direction perpendicular to the conveying direction, by using the same light receiving element in the reading head of the image reading unit 22.

In the examples shown in FIGS. 19 and 20, the conveying direction or the direction of the recording paper is changed by 90 degrees. However, in case that the conveying direction or the like can be changed by an optional angle, it is possible to read the whole of the straight line which is inclined at the optional angle with respect to the conveying direction of the recording paper in the image forming unit 10, by using the same light receiving element of the image reading unit 22.

As explained above, in the image forming system 5, the detailed operation information of each unit in the test operation is collected. Then, the reading result obtained by reading the thin lines with the image reading unit 22 is evaluated in consideration of the collected detailed operation information and the width of each thin line is corrected. Therefore, it is possible to correct the width of the thin line and the like with high accuracy.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

For example, the test operation is executed with the predetermined period. Further, the setting of the above period, that is, the setting of the period with which the correction parameter, such as the thinning condition or the like, is updated, is received from a user. Then, the test operation is executed with the set period to update the correction parameter. In case that the test pattern is printed out of the effective area, for example, in the margin of the recording paper, the test operation may be executed in each printing and the evaluation result may be fed back to the correction.

The present invention is not limited to the first to the sixth examples described in the embodiment, and is applied to an optional case in which the thin lines are evaluated in consideration of the detailed operation information.

In the embodiment, as the image forming system 5, a multi function peripheral is exemplified. However, it is not necessary to provide the scanner unit 25 and the like. The image forming system may be a print device comprising the image forming unit 10 and the image reading unit 22 for reading the recording paper output from the image forming unit 10, in the conveying path on the downstream side of the image forming unit 10.

The image forming method carried out in the image forming unit 10 is not limited to the electrophotographic process as explained in the embodiment. An inkjet method may be used.

One of the objects of the above embodiment is to provide an image forming system which automatically carries out the correction relating to the printing of a specified thin line by reflecting the operation state of each unit in the printing of the test pattern and in the optical reading of the test pattern.

In the embodiment, the test operation in which the test pattern is printed by the image forming unit and in which the recording paper is optically read immediately by the image reading unit provided on the downstream side of the image forming unit, is executed. The correction control unit controls the execution of the test operation and collects the information indicating the operation state of each unit in the execution of the test operation. For example, the correction control unit collects the information indicating each state of the image forming unit and the image reading unit in the execution of the test operation, the printing condition, the reading condition, and the like. Then, the correction control unit evaluates the width of the thin lines and the like, in the read image obtained in the test operation in consideration of the information indicating the operation state of each unit in the execution of the test operation, and carries out the correction relating to the printing of a specified thin line.

In the embodiment, the width and the density of the specified thin line is corrected in consideration of each position of the thin lines of the test pattern in the recording paper. In the test pattern, it is preferable to print the thin lines so as to disperse the thin lines into the whole area of the recording paper.

In the embodiment, the recording paper is divided into a plurality of small areas and the variation in the width and the density of the thin line of the test pattern among the small areas is judged. Then, the correction is carried out by using the correction value for each small area so as to suppress the variation. Further, because the thin lines perpendicular to the conveying direction of the recording paper and the thin lines parallel to the conveying direction are printed in each small area, it is possible to carry out the correction according to each direction of the thin lines.

In the embodiment, the correction value is calculated for each color.

In the embodiment, by using the test pattern including the thin line having the width corresponding to 1 to 5 pixels at the resolution of the image forming unit, the correction relating to the printing of the specified thin line is carried out.

In the embodiment, the intended width and the intended density are set in accordance with the measured values.

In the embodiment, it is possible to carry out the correction by detect the long period of the variation which strides across a plurality of sheets of recording paper.

In the embodiment, the correction parameter is updated by executing the test operation with the period set by a user.

In the embodiment, the suitable correction parameter for obtaining the intended width is selected among a plurality of correction parameters in accordance with the evaluation result of the test operation.

In the embodiment, each value of a plurality of candidates for the correction parameter is modified in accordance with the evaluation result of the test operation so as to obtain each intended width of the thin lines.

In the embodiment, from the result obtained by executing the test operation using the test pattern including the thin line having the first color, the thin line having the second color and the thin line having the secondary color made by mixing the first color and the second color, the correction parameter to be applied when the specified thin line having the optional secondary color is printed is calculated. Then, the correction relating to the printing of the specified thin line having the optional secondary color is carried out.

In the embodiment, the width and the like of the thin line having the secondary color is evaluated by eliminating the increase in the width, which is caused by the registration displacement.

In the embodiment, the correction is carried out by changing the correction value according to the laser beam to be used for the printing of the specified thin line.

In the embodiment, the correction is applied to the specified thin line having the width of 1 pixel, or the specified thin line having the width of a plurality of pixels.

In the embodiment, the correction relating to the printing of the specified thin line is carried out for the one-side printing, the front side in the two-side printing and the rear side in the two-side printing, respectively.

In the embodiment, by comparing the data obtained by reading the thin line with the light receiving element which is arranged in the same position in the image reading unit, the variation in the state of the width of the formed thin line is detected.

In the embodiment, by comparing the data obtained in case that the phase of the position of the thin line with respect to the light receiving element in the image reading unit is the same, the variation in the state of the width of the formed thin line is detected.

In the embodiment, it is possible to evaluate the whole of the straight line printed in the direction which is not the conveying direction, by reading the straight line with the same light receiving element of the image reading unit. Therefore, the thin line can be evaluated in accordance with the measured values having no variation in the reading result, which is caused by using the different light receiving elements of the image forming unit.

According to the image forming system, it is possible to automatically carry out the correction relating to the printing of the specified thin line by reflecting the operation state of each unit in the printing of the test pattern and in the optical reading of the test pattern.

The present U.S. patent application claims the priority of Japanese Patent Application No. 2013-128208, filed on Jun. 19, 2013, according to the Paris Convention, and the entirety of which is incorporated herein by reference for correction of incorrect translation.

What is claimed is:

1. An image forming system, comprising:
a conveying unit configured to convey recording paper;
an image forming unit configured to print an image on the recording paper in a conveying path of the conveying unit;
an image reading unit configured to optically read the recording paper in the conveying path on a downstream side of the image forming unit and to obtain a read image; and
a correction control unit configured to control an execution of a test operation in which a test pattern including one or more thin lines are printed on the recording paper by the image forming unit and in which the recording paper on which the test pattern is printed is read by the image reading unit, to collect information indicating an operation state of each unit in the execution of the test operation, to evaluate the thin lines in the read image obtained in the test operation in consideration of the collected information, and to carry out a correction relating to printing of a specified thin line.

2. The image forming system of claim 1, wherein in the test pattern, the thin lines are arranged in portions of the recording paper, and
wherein the correction control unit detects a width and a density of each thin line arranged in the portions in the read image, evaluates variation in the width and the density among the thin lines in the read image, and carries out the correction to suppress the variation so as to cause the width and the density to be an intended width and an intended density.

3. The image forming system of claim 2, wherein in the test pattern, the thin lines include thin lines perpendicular to a conveying direction of the recording paper and thin lines parallel to the conveying direction of the recording paper arranged with a predetermined period in each of a plurality of areas into which the recording paper is divided, and
wherein the correction control unit calculates a correction value for suppressing the variation, for each area.

4. The image forming system of claim 2, wherein in the test pattern, the thin lines are drawn in all colors used in the image forming unit, and
wherein the correction control unit calculates a correction value for suppressing the variation, for each color.

5. The image forming system of claim 2, wherein each width of the thin lines constituting the test pattern corresponds to 1 to 5 pixels at a resolution of the image forming unit.

6. The image forming system of claim 2, wherein the intended width and the intended density are calculated from an average of the variation.

7. The image forming system of claim 2, wherein the intended width and the intended density are predetermined values.

8. The image forming system of claim 2, wherein the correction control unit successively executes the test operation by using a plurality of sheets of the recording paper, detects a period of the variation in the width, which is caused in a conveying direction of the recording paper, from the read image obtained from the plurality of successive sheets of the recording paper, and changes a correction parameter for the width according to the detected period.

9. The image forming system of claim 1, wherein a setting of an update period with which a correction parameter to be used in the correction is updated is received from a user, and the correction parameter is updated by executing the test operation with the update period.

10. The image forming system of claim 1, wherein the test pattern includes a plurality of types of the thin lines which are obtained by correcting a width of a predetermined thin line in accordance with a plurality of candidates for a correction parameter, respectively, and
wherein the correction control unit compares each width of the thin lines in the read image obtained in the test operation, which are obtained by correcting the width of the predetermined thin line in accordance with the candidates for the correction parameter, with a reference width, and select the correction parameter among the candidates in accordance with a result of comparing each width with the reference width.

11. The image forming system of claim 1, further comprising a correction parameter selecting unit configured to select a correction parameter for correcting a width of the specified thin line among a plurality of candidates for the correction parameter,
wherein the test pattern includes a plurality of types of the thin lines which are obtained by correcting a width of a predetermined thin line in accordance with the plurality of candidates for the correction parameter, respectively, and wherein the correction control unit compares each width of the thin lines in the read image obtained in the test operation, which are obtained by correcting the width of the predetermined thin line in accordance with the candidates for the correction parameter, with an intended width in a case that each candidate for the correction parameter is used, and modifies each value of the candidates for the correction parameter in accordance with a result of comparing each width with the intended width.

12. The image forming system of claim 1, wherein the correction control unit executes the test operation by using a test pattern a thin line having a secondary color made by mixing a first color material and a second color material, a thin line having the first color obtained by using only the first color material, and a thin line having the second color obtained by using only the second color material, and wherein the correction control unit calculates a correction parameter for a width of the specified thin line having an optional secondary color made by mixing an optional amount of the first color material and an optional amount of the second color material in accordance with a width of the thin line having the secondary color, a width of the thin line having the first color, and a width of the thin line having the second color in the read image obtained in the test operation to carry out the correction relating to the printing of the specified thin line having the optional secondary color.

13. The image forming system of claim 12, wherein an increase in the width of the thin line having the secondary color, which occurs due to a misregistration which is caused when the first color material and the second color material are overlapped, is subtracted from the width of the thin line having the secondary color in the read image obtained in the test operation.

14. The image forming system of claim 1, wherein the image forming unit forms the image by scanning the image with a plurality of laser beams in parallel, and wherein the correction control unit evaluates each thin line in the read image obtained in the test operation, by specifying a laser beam used for forming the image on each pixel, and carries out the correction relating to the printing of the specified thin line according to the laser beam used for the printing of the specified thin line.

15. The image forming system of claim 14, wherein the specified thin line is drawn by using one laser beam or by combining a plurality of laser beams.

16. The image forming system of claim 1, wherein the image forming unit has a one-side printing mode for printing the image on only one side of the recording paper, and a two-side printing mode for printing images on both a front side of the recording paper and a rear side of the recording paper, and wherein the correction control unit evaluates each thin line for a case in which the test operation is executed in the one-side printing mode, a case in which the test operation is executed for the front side in the two-side printing mode, and a case in which the test operation is executed for the rear side in the two-side printing mode, respectively, and carries out the correction relating to the printing of the specified thin line according to a case in which the specified thin line is printed in the one-side printing mode, a case in which the specified thin line is printed on the front side in the two-side printing mode, or a case in which the specified thin line is printed on the rear side in the two-side printing mode.

17. The image forming system of claim 1, wherein the correction control unit recognizes a pixel position of a light receiving element in the image reading unit, which reads each thin line in the test pattern, from the collected information, and detects variation in a state of a width of the thin line, by comparing data obtained by reading the thin line with the light receiving element having the same pixel position.

18. The image forming system of claim 1, wherein the correction control unit recognizes a phase difference between the thin line in the test pattern and a light receiving element in the image reading unit, which reads the thin line, from the collected information, and detects variation in a state of a width of the thin line, by comparing data obtained in a case that the phase difference is within an acceptable range.

19. The image forming system of claim 1, further comprising a direction changing unit configured to change a conveying direction of the recording paper or a direction of the recording paper between the image forming unit and the image reading unit so as to direct a straight line printed by the image forming unit in a direction which is not the conveying direction of the recording paper to a direction perpendicular to a reading direction in which the image is read by the image reading unit line by line.

* * * * *